United States Patent
Jun et al.

(10) Patent No.: US 11,106,109 B2
(45) Date of Patent: Aug. 31, 2021

(54) DISPLAY PANEL CAPABLE OF THREE-AXIS FOCAL POINT LENGTH CONVERSION

(71) Applicant: INDUSTRY-ACADEMIC COOPERATION FOUNDATION YONSEI UNIVERSITY, Seoul (KR)

(72) Inventors: Seong Chan Jun, Seoul (KR); Juyeong Oh, Gimpo-si (KR); Gilho Lee, Seoul (KR); Sehong Park, Paju-si (KR); Youngho Seo, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 207 days.

(21) Appl. No.: 16/261,769

(22) Filed: Jan. 30, 2019

(65) Prior Publication Data

US 2019/0235348 A1 Aug. 1, 2019

(30) Foreign Application Priority Data

Jan. 30, 2018 (KR) .......................... 10-2018-0011396

(51) Int. Cl.
*G02F 1/29* (2006.01)
*G02B 3/08* (2006.01)

(52) U.S. Cl.
CPC ................. *G02F 1/29* (2013.01); *G02B 3/08* (2013.01); *G02F 1/294* (2021.01)

(58) Field of Classification Search
CPC .... G02B 3/08; G02B 3/10; G02F 1/29; G02F 2001/294
USPC ........................................................ 359/319
See application file for complete search history.

(56) References Cited

U.S. PATENT DOCUMENTS

| 2007/0139333 | A1* | 6/2007 | Sato | ................. | G02F 1/134309 |
| | | | | | 345/90 |
| 2016/0021361 | A1* | 1/2016 | Kroon | ................. | H04N 13/324 |
| | | | | | 348/59 |

FOREIGN PATENT DOCUMENTS

| CN | 101010619 A | 8/2007 |
| CN | 105027564 A | 11/2015 |
| KR | 10-2007-0033043 A | 3/2007 |
| KR | 10-2015-0050640 A | 5/2015 |

OTHER PUBLICATIONS

KIPO Office Action, dated Aug. 7, 2019, for Korean Patent Application No. 10-2018-0011396 which corresponds to the above-identified U.S. application.

(Continued)

*Primary Examiner* — Mahidere S Sahle
(74) *Attorney, Agent, or Firm* — LRK Patent Law Firm

(57) ABSTRACT

A photoluminescence display panel for three-axis focal point length conversion includes: a lens layer having a two-dimensional Fresnel pattern formed thereon to adjust a path of light entering from a light source; a light conversion layer stacked on the lens layer to convert a color of light that has pass through the lens layer; and a power supply unit for directly applying a voltage to the lens layer, in which as the lens layer is partitioned into a plurality of areas and the power supply unit adjusts the voltage applied to each area of the lens layer partitioned into a plurality of areas, a focal point position can be changed in a three-dimensional space, and thus the aperture and resolution of the display panel can be enhanced.

16 Claims, 10 Drawing Sheets

(56) References Cited

OTHER PUBLICATIONS

Xiao-Qian Wang et al., "Liquid crystal Fresnel lens display", Chin. Phys. B vol. 25, No. 9 (2016) 094215.
SIPO Office Action, dated Jun. 15, 2020, for Chinese Patent Application No. 201910093088.9 which corresponds to the above-identified U.S. application.

* cited by examiner

DISPLAY PANEL CAPABLE OF THREE-AXIS FOCAL POINT LENGTH CONVERSION

CROSS REFERENCE TO RELATED APPLICATION

This application claims priority to Korean Patent Application No. 10-2018-0011396, filed Jan. 30, 2018, which is hereby incorporated by reference in its entirety into this application.

BACKGROUND OF THE INVENTION

1. Field of the Invention

The present invention relates to a display panel, and particularly, to a display panel capable of three-axis focal point length conversion, which can change a focal point position in all directions of X, Y and Z axes, as well as in the propagation direction of light, by partitioning a lens layer having a Fresnel pattern etched thereon into a plurality of areas, and directly or indirectly applying different voltages to the partitioned areas.

2. Description of Related Art

A display device means a device showing inputted data on a screen so that a user may see the data, and as information techniques are advanced, requirements on the display device also increase in a variety of forms.

Recently, as a mobile device such as a smart phone, a laptop computer, a digital camera, a camcorder, a portable information terminal, a notebook computer or a tablet personal computer, as well as an electronic device such as a desktop computer, a television, an advertisement board or a display device for exhibition, begins to need a display device, demands for display devices slim and having high resolution compared with a conventional display device is gradually increasing.

However, as the lenses used in a conventional display device is capable of adjusting a focal point length only in a direction the same as the propagation direction of light (the direction of entering the lens), a transistor for adjusting a ratio of red R, green G and blue B should be used to implement various colors, and since wires for distinguishing sub-pixels should be connected to utilize the transistor, a certain area of the R, G and B is hidden by the wires as shown in FIG. 1, and as some areas of the pixels are hidden by the transistor and the wires, the aperture ratio of the display device is lowered.

In addition, resolution of a display device increases as the pixel size is small and the number of pixels is large, and there is a limit in reducing the pixel size since the lenses used in a conventional display device may adjust only the focal point length and may not change the focal point position to the left and right, and thus sub-pixels may not be arranged freely. In addition, since the conventional display device has a problem in that the lifespan of the display device may be lowered as the heat generated by the transistor is transferred to a color filter, an OLED or the like through the wires, a new display device which can solve the problems that the conventional display device has is required.

SUMMARY OF THE INVENTION

Therefore, the present invention has been made in view of the above problems, and it is an object of the present invention to provide a display panel, which can freely adjust a focal point position, as well as a focal point length, in a three-dimensional space by partitioning a lens layer on which a Fresnel pattern is formed into at least two areas and applying different voltages to the partitioned areas.

The technical problems to be solved by the present invention are not limited to the technical problems mentioned above, and unmentioned other technical problems may be clearly understood by those skilled in the art from the following descriptions.

To solve the above problems, according to one aspect of the present invention, there is provided a display device including: a lens layer having a two-dimensional Fresnel pattern formed thereon to adjust a path of light entering from a light source; a light conversion layer stacked on the lens layer to convert a color of light that has pass through the lens layer; and a power supply unit for directly applying a voltage to the lens layer, in which as the lens layer is partitioned into a plurality of areas and the power supply unit adjusts the voltage applied to each area of the lens layer partitioned into a plurality of areas, a focal point position can be changed in a three-dimensional space.

Here, the lens layer is a two-dimensional flat lens.

In addition, the light conversion layer may include: a first light conversion layer for converting incident light into first light; a second light conversion layer for converting the incident light into second light; and a third light conversion layer for converting the incident light into third light.

At this point, the lens layer is partitioned into two areas of a first lens unit and a second lens unit, and the first light conversion layer, the second light conversion layer, and the third light conversion layer are arranged on the lens layer side by side in the horizontal direction.

Particularly, the power supply unit may freely adjust the focal point position on the same plane by applying different voltages to the first lens unit and the second lens unit.

In addition, the lens layer may be partitioned into three areas of a first lens unit, a second lens unit, and a third lens unit.

At this point, the power supply unit may freely adjust the focal point position in a three-dimensional space by adjusting magnitudes of the voltages applied to the first lens unit, the second lens unit and the third lens unit.

In addition, the first light conversion layer, the second light conversion layer, and the third light conversion layer may be arranged on the lens layer side by side in the horizontal direction.

Alternatively, the first light conversion layer, the second light conversion layer, and the third light conversion layer may be stacked on the lens layer in order.

In addition, when the focal point position is adjusted, the power supply unit adjusts magnitude of a voltage applied to each of the partitioned areas of the lens layer according to an area ratio of the partitioned lens layers.

As another embodiment of the present invention, there is provided a display panel including: an electrode layer; an insulation layer stacked on the electrode layer; a lens layer stacked on the insulation layer and having a two-dimensional Fresnel pattern formed thereon to adjust a path of light entering from a light source; and a light conversion layer stacked on the lens layer to convert a color of light that has passed through the lens layer, in which as the lens layer is partitioned into a plurality of areas and the electrode layer adjusts the voltage applied to each area of the lens layer partitioned into a plurality of areas, a focal point position can be changed in a three-dimensional space.

At this point, the electrode layer adjusts the magnitude of the voltage applied to each of the partitioned areas of the lens layer according to an area ratio of the partitioned lens layers.

In addition, the lens layer is partitioned into three areas of a first lens unit, a second lens unit, and a third lens unit, and the electrode layer includes: a first electrode layer for applying a voltage to the first lens unit; a second electrode layer for applying a voltage to the second lens unit; and a third electrode layer for applying a voltage to the third lens unit.

In addition, the first electrode layer, the second electrode layer and the third electrode layer may freely adjust the focal point position in a three-dimensional space by applying different voltages to the first lens unit, the second lens unit and the third lens unit.

In addition, the light conversion layer may include: a first light conversion layer for converting incident light into first light; a second light conversion layer for converting the incident light into second light; and a third light conversion layer for converting the incident light into third light, in which the first light conversion layer, the second light conversion layer, and the third light conversion layer are arranged on the lens layer side by side in a horizontal direction.

Alternatively, the first light conversion layer, the second light conversion layer, and the third light conversion layer may be stacked on the lens layer in order.

BRIEF DESCRIPTION OF THE DRAWINGS

FIG. 8B is a cross-sectional view taken along the line A-A' of a display panel in which a lens layer is partitioned into three areas.

DETAILED DESCRIPTION OF THE PREFERRED EMBODIMENT

Figure 1:
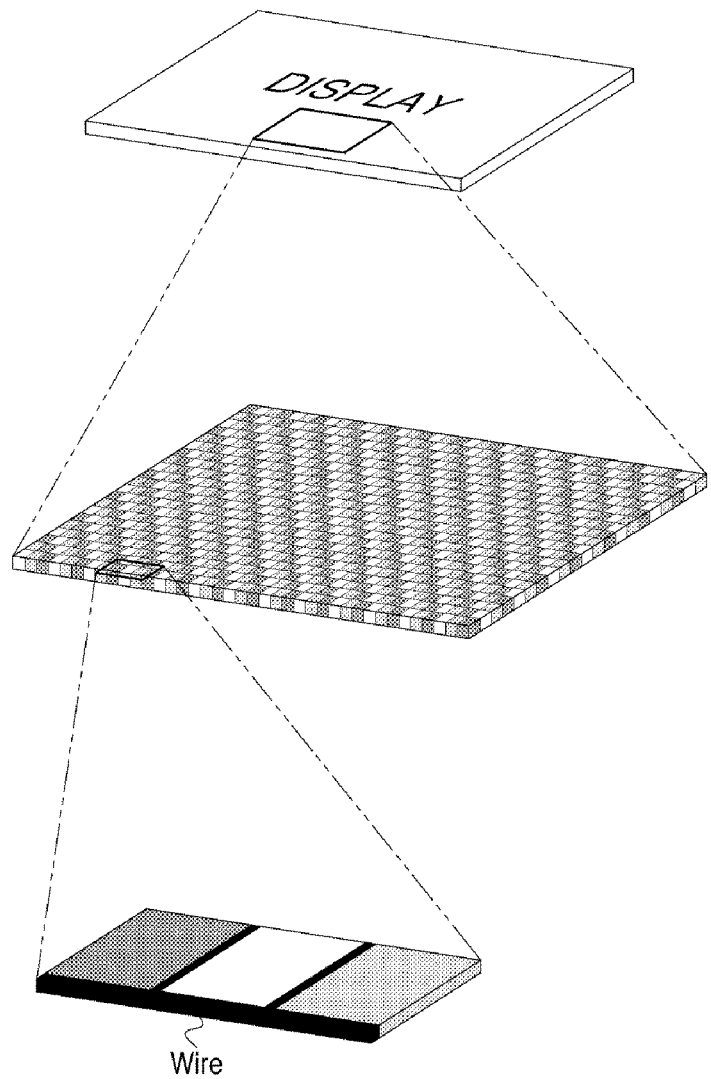
FIG. 1 is a view showing the problems that a conventional display device has, which is a view specifically showing a certain area of R, G and B pigments hidden by a wire.

Hereafter, the present invention will be described in more detail with reference to the drawings. It should be noted that in the drawings, like elements are denoted by like symbols wherever possible. In addition, detailed description of publicized functions and configurations that may obscure the gist of the present invention will be omitted.

It should be understood that when an element is referred to as being "connected" or "coupled" to another element, it may be directly connected or coupled to the other element, or intervening elements may be present. In addition, when a member is referred to as being placed "on" another member throughout this specification, it includes a case of having another member between the two members, as well as a case in which a member contacts with another member.

It will be further understood that the terms such as "include" and/or "have" used in this application specify the presence of stated features, integers, steps, operations, elements, and/or components, but do not preclude the presence or addition of one or more other features, integers, steps, operations, elements, components, and/or groups thereof.

Before describing the present invention, a conventional display panel will be briefly described with reference to FIG. 1.

FIG. 1 is a view showing the problems that a conventional display panel has, and specifically is a view showing an area of R, G and B pigments hidden by a wire.

A thin film transistor is a kind of switching device which determines whether or not to supply voltage to liquid crystal and performs a function for controlling pixels, which are basic units of a display.

Particularly, the transistor may implement various colors by adjusting luminance of sub-pixels which emit a light of R, G and B, and since the lenses used in the conventional display panel may adjust only a focal point length, some areas of pixels are hidden by a transistor and wires to distinguish R, G and B as shown in FIG. 1 to adjust the luminance of the sub-pixels.

That is, as some areas of the pixels are hidden by the wires, luminance of the display is lowered as the aperture ratio is lowered, and there is a limit in improving resolution of a display since the size of a pixel has to be increased to obtain equal luminance.

Accordingly, an abject of the present invention is to solve the problems of the conventional display panel by providing a display panel having a lens layer capable of adjusting even a focal point position, as well as a focal point length.

Hereinafter, a display panel according to an embodiment of the present invention will be described in detail with reference to FIGS. 2A, 2B and 3.

Figure 2A:
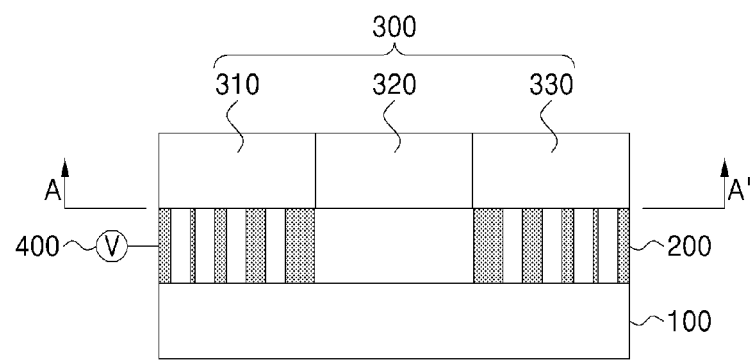
FIG. 2A is a side view showing a display panel in which three light conversion layers are arranged side by side in the horizontal direction according to an embodiment of the present invention.
Figure 2B:
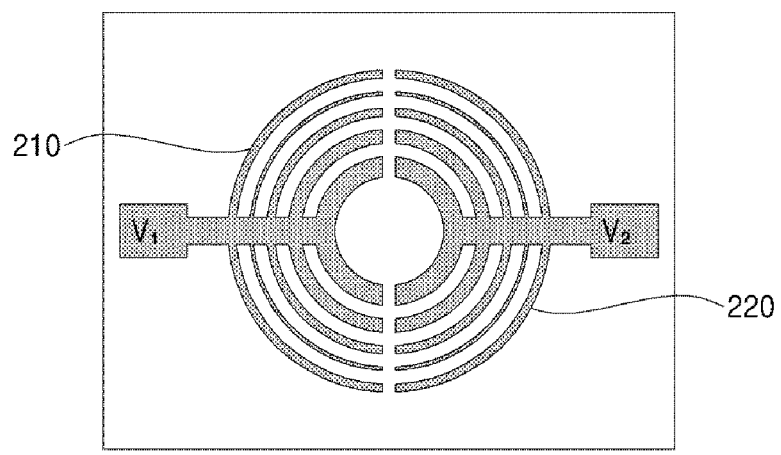
FIG. 2B is a cross-sectional view taken along the line A-A' of a display panel in which a lens layer is partitioned into two areas.
Figure 3:
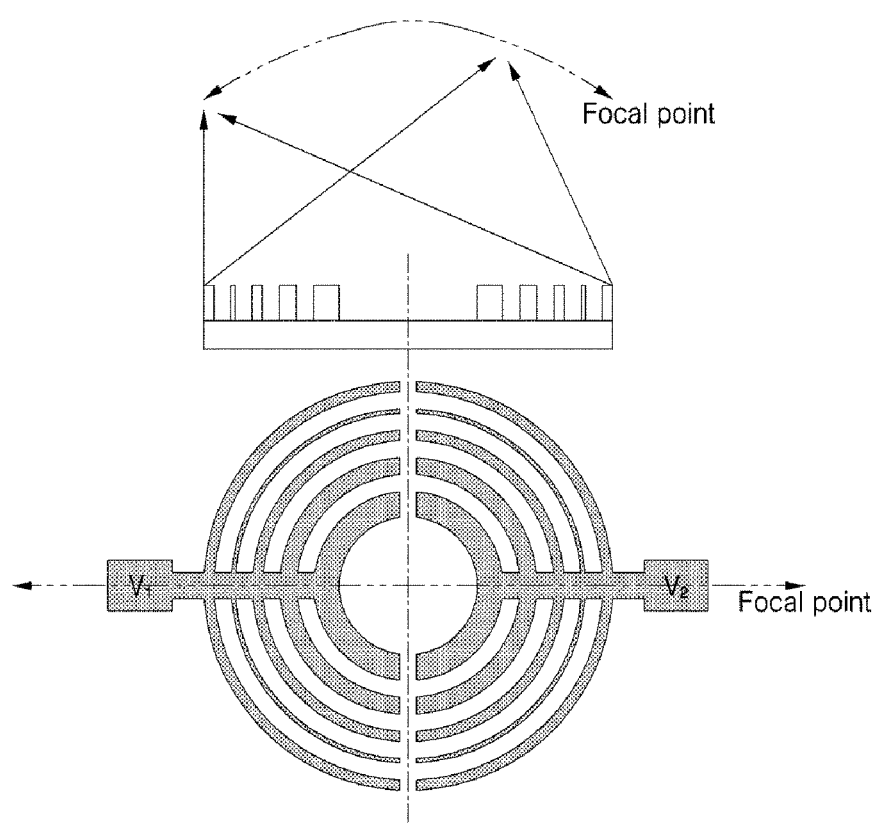
FIG. 3 is a view showing a process of adjusting a focal point position on the same plane by adjusting magnitude of a voltage applied to a lens layer partitioned into two areas.

FIG. 2A is a side view showing a display panel in which three light conversion layers are arranged side by side in the horizontal direction according to an embodiment of the present invention, FIG. 2B is a cross-sectional view taken along the line A-A' of a display panel in which a lens layer is partitioned into two areas, and FIG. 3 is a view showing a process of adjusting a focal point position on the same plane by adjusting magnitude of a voltage applied to a lens layer partitioned into two areas.

A display panel according to an embodiment of the present invention includes: a lens layer 200 having a two-dimensional Fresnel pattern formed thereon to adjust a path of light entering from a light source; a light conversion layer 300 stacked on the lens layer 200 to convert a color of the light that has pass through the lens layer 200; and a power supply unit 400 for directly applying a voltage to the lens layer 200, and particularly, as the lens layer is partitioned into a plurality of areas and the power supply unit 400 adjusts the magnitude of the voltage applied to each area of the lens layer 200 partitioned into a plurality of areas, a focal point position can be freely changed in a three-dimensional space.

At this point, although a case of partitioning the lens layer 200 into two areas is shown in FIGS. 2B and 3, this is only an example, and the lens layer 200 may be partitioned into three areas or more (four, five, etc.) without a problem.

In addition, although it is shown in FIGS. 2A, 2B and 4, which will be described below, that the lens layer 200 is stacked on a substrate 100, it is not that the lens layer 200 should be necessarily stacked on the substrate 100, and since i) a BLU light source or ii) an LED, an OLED, a micro LED or the like may be placed under the lens layer 200, the display panel according to an embodiment of the present invention may be applied to various types of display devices.

Next, the lens layer 200 and the light conversion layer 300, which are the core elements of the display panel of the present invention, will be described in detail.

First, the lens layer 200 performs a function of changing a focal point position by adjusting the path of light entering from an external light source.

At this point, the lens layer 200 may be a two-dimensional flat lens formed of a two-dimensional material to make the display panel slim overall, and the two-dimensional material configuring the lens layer 200 may be any one among $MoS_2$, $WSe_2$, $WS_2$, $MoTe_2$ and $MoSe_2$ and more preferably graphene.

Since the graphene has the advantages of small thickness (only 0.2 nm), excellent physical and chemical stability, and excellent electrical conductivity as much as to be called as a "dream nanomaterial", it is suitable to be used in a display device, and thus graphene-based flat lenses, which can adjust a focal point length by adjusting a voltage applied to the graphene, have been developed using a property that the electrical conductivity and the refractive index change if magnitude of the voltage applied to the graphene is adjusted.

However, since a conventional graphene-based flat lens is able to adjust a focal point position only in a direction the same as the propagation direction of light and may not move the focal point position to the left and right or may not adjust the focal point position to another position in a three-dimensional space, the R, G and B luminance of a pixel cannot be adjusted without a transistor and a wire, and thus the problem of reducing the aperture ratio as some areas of the pixels are hidden by the wire cannot be solved although a graphene-based flat lens is used.

However, as a Fresnel pattern is formed by partitioning a two-dimensional material like the graphene into two or more areas when the Fresnel pattern is formed on the lens layer 200 of the present invention by etching a two-dimensional material, different voltages may be applied to the partitioned areas of the lens layer 200. Therefore, each area of the partitioned lens layer 200 may have a different refractive index, and thus a focal point position can be freely adjusted in a three-dimensional space, as well as in the propagation direction of light. At this point, since the areas of the lens layer 200 partitioned into a plurality of areas are arranged to be spaced apart from each other by a predetermined distance and may not be affected by the voltages applied to the other areas of the lens layer 200.

As the lens layer 20 is partitioned into a plurality of areas, the display panel of the present invention may change the focal point position, as well as the focal point length, and the R, G and B luminance may be adjusted by adjusting the focal point position in the lens layer 200 itself without distinguishing R, G and B areas through a transistor and a wire, and as a result, as the display panel of the present invention may implement various colors without hiding some areas of pixels, the problem of the conventional display panel of reducing the aperture ratio by the transistor and the wire can be solved.

However, when the lens layer 200 is partitioned into a plurality of areas, the power supply unit 400 should apply a higher voltage, as the size of the partitioned areas increases, to change the refractive index of the lens layer 200 as much as desired, and thus when a focal point position is adjusted, the power supply unit 400 should adjust magnitude of a voltage applied to each partitioned area of the lens layer 200 according to an area ratio of the lens layer 200 partitioned into a plurality of areas. For example, when the lens layer 200 is partitioned into an area having a size of 40 and an area having a size of 60 (those are relative sizes), a focal point position may move left or right when a voltage of the same magnitude is applied to each of the areas, and since only the focal point length can be changed without changing the focal point position when 4V is applied in the area having a size of 40 and 6V is applied in the area having a size of 60, the power supply unit 400 should apply a voltage considering the ratio of the partitioned areas of the lens layer 200, and because of the reasons, it is preferable to partition the lens layer 200 into equal areas to efficiently adjust a focal point position.

Next, describing the light conversion layer 300, the light conversion layer 300 performs a function of converting the color of incident light, and specifically, when light of which the traveling path is changed while passing through the lens layer 200 enters in the direction of the light conversion layer 300, the light conversion layer 300 performs a function of converting the incident light into light having one of the colors of R, G and B.

The light conversion layer 300 may perform a function of a color filter used in a conventional display panel to convert light or may convert light by being stimulated by incident light and performing photoluminescence.

At this point, the photoluminescence means a phenomenon in which a material absorbs light energy and thus emits light without generating heat, and more specifically, it means a phenomenon of discharging absorbed energy as light when the material is put into an excited state by the light energy and returns to a ground state.

The light conversion layer 300 includes a first light conversion layer 310 for converting incident light into first light, a second light conversion layer 320 for converting the incident light into second light, and a third light conversion layer 330 for converting the incident light into third light, to implement a color of R, G and B, and at this point, the first light, the second light and the third light are one of red light, green light and blue light, and the first light, the second light and the third light are lights different from each other. For example, the first light may be red light, the second light may be green light, and the third light may be blue light, or the first light may be green light, the second light may be red light, and the third light may be blue light.

Since the lens layer 200 of the present invention is partitioned into a plurality of areas and may freely adjust a focal point position as described above, the first light conversion layer 310, the second light conversion layer 320 and the third light conversion layer 330 configuring the light conversion layer 300 may be freely arranged, and various embodiments of arranging the light conversion layers will be described below.

In addition, although it is not shown in the figure, the light conversion layer 300 may further include a fourth light conversion layer (not shown) for converting incident light into white light to further improve the resolution of the display panel by adjusting the ratio of R, G, B and W.

Next, describing an embodiment of the display panel of the present invention, the lens layer 200 may be partitioned into two areas of a first lens unit 210 and a second lens unit 220 as shown in FIG. 2B, and the power supply unit 400 may freely adjust a focal point position on the same plane as shown in FIG. 3 by adjusting the magnitudes of the voltages applied to the first lens unit 210 and the second lens unit 220 partitioned into two areas.

For example, the focal point position may be moved to the left side from the propagation direction of the light by applying the second lens unit 220 with a voltage higher than that of the first lens unit 210, and on the contrary, the focal point position may be moved to the right side from the propagation direction of the light by applying the first lens unit 210 with a voltage higher than that of the second lens unit 220.

When the lens layer 200 is partitioned into two areas, a focal point position can be freely adjusted in the left, right, up and down directions on the same plane as shown in FIG. 3 although the focal point position cannot be freely adjusted in a three-dimensional direction, and thus the first light conversion layer 310, the second light conversion layer 320 and the third light conversion layer 330 may be arranged on the lens layer 20 side by side in the horizontal direction as shown in FIG. 2A.

When the first light conversion layer 310, the second light conversion layer 320 and the third light conversion layer 330 are arranged side by side in a row, it does not need to distinguish the first light conversion layer 310, the second light conversion layer 320 and the third light conversion layer 330 using a transistor and a wire unlike the pixels of a conventional display panel since the ratio of the first light, the second light and the third light may be adjusted by adjusting the focal point position on the lens layer 200, and thus the aperture ratio of the display panel can be improved compared with that of the conventional display panel, and in addition, since the first light conversion layer 310, the second light conversion layer 320 and the third light conversion layer 330 can be prevented from being damaged by the heat generated by the transistor and the wire, the lifespan of the display panel can be extended.

In addition, since the focal point length may be adjusted like a conventional Fresnel lens when the lens layer 200 is partitioned into two areas, the ratio of R, G and B may be adjusted by stacking the first light conversion layer 310, the second light conversion layer 320 and the third light conversion layer 330 on the lens layer 200 in order and changing the focal point length of the lens layer 200.

The resolution of the display panel is improved as the size of the pixel is small and the number of pixels increases, and since the display panel of the present invention may reduce the overall pixel size to be smaller than that of the conventional pixel, in which R, G and B sub-pixels are arranged side by side in the horizontal direction, by stacking the first light conversion layer 310, the second light conversion layer 320 and the third light conversion layer 330 in order as described above and adjusting the ratio of R, G and B by adjusting the focal point length, the resolution of the display panel may be enhanced.

Next, still another embodiment of the display panel of the present invention will be described with reference to FIGS. 4A to 7.

Figure 4A:
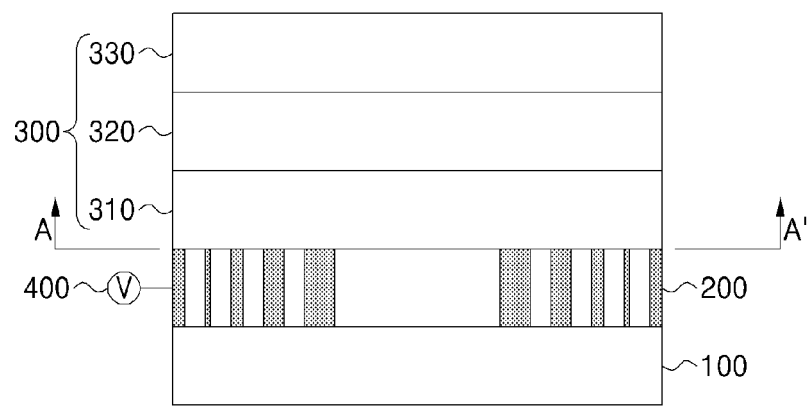
FIG. 4A is a side view showing a display panel in which three light conversion layers are stacked in order according to an embodiment of the present invention.
Figure 4B:
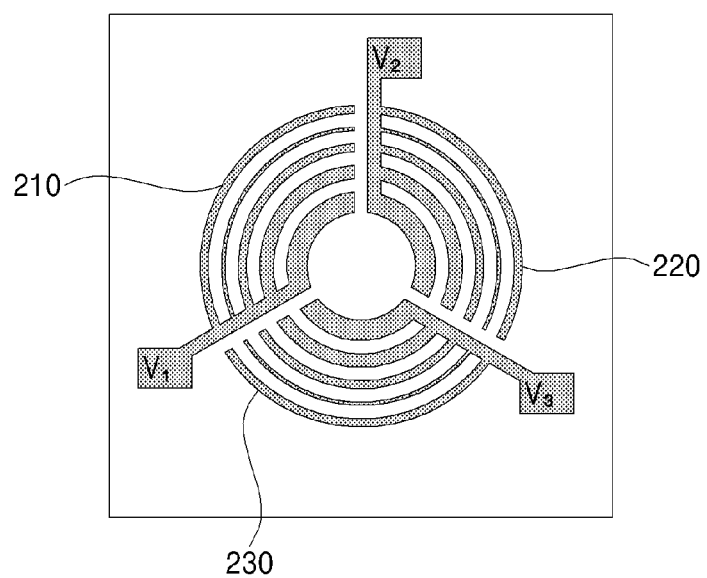
FIG. 4B is a cross-sectional view taken along the line A-A' of a display panel in which a lens layer is partitioned into three areas.
Figure 5:
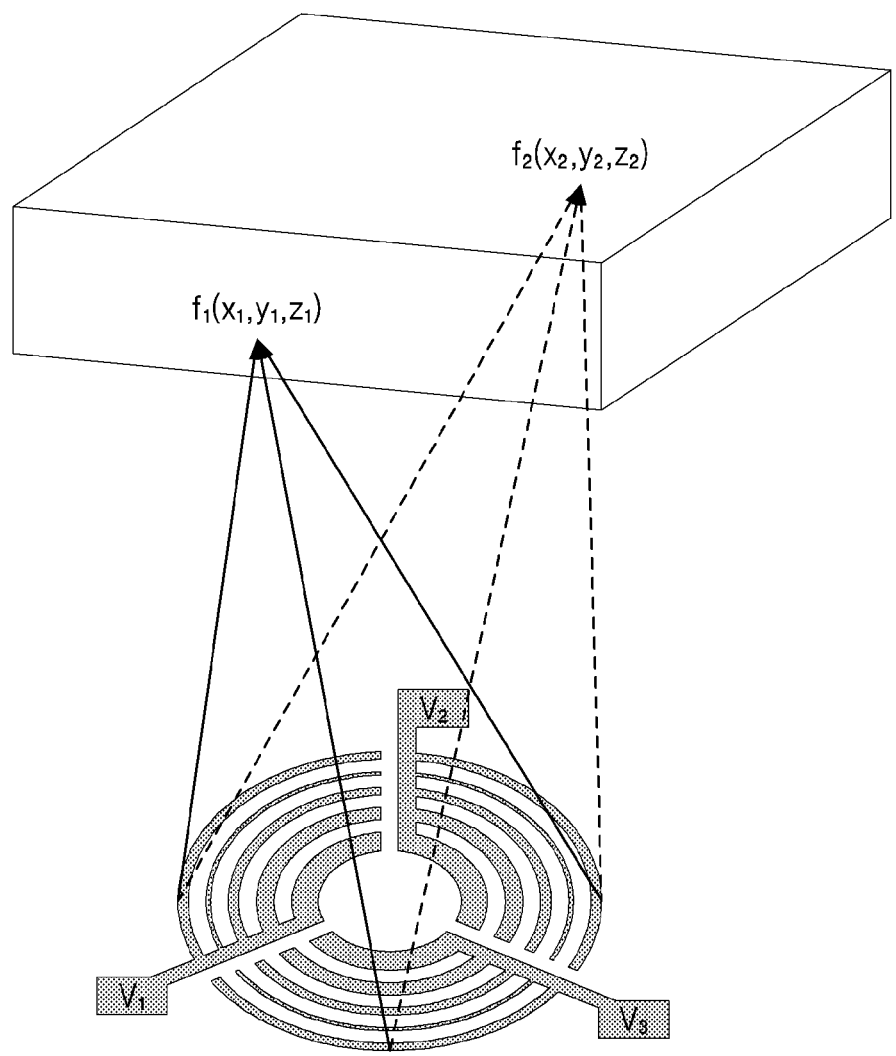
FIG. 5 is a view showing a process of freely adjusting a focal point position in a three-dimensional space by adjusting magnitude of a voltage applied to a lens layer partitioned into three areas.
Figure 6:
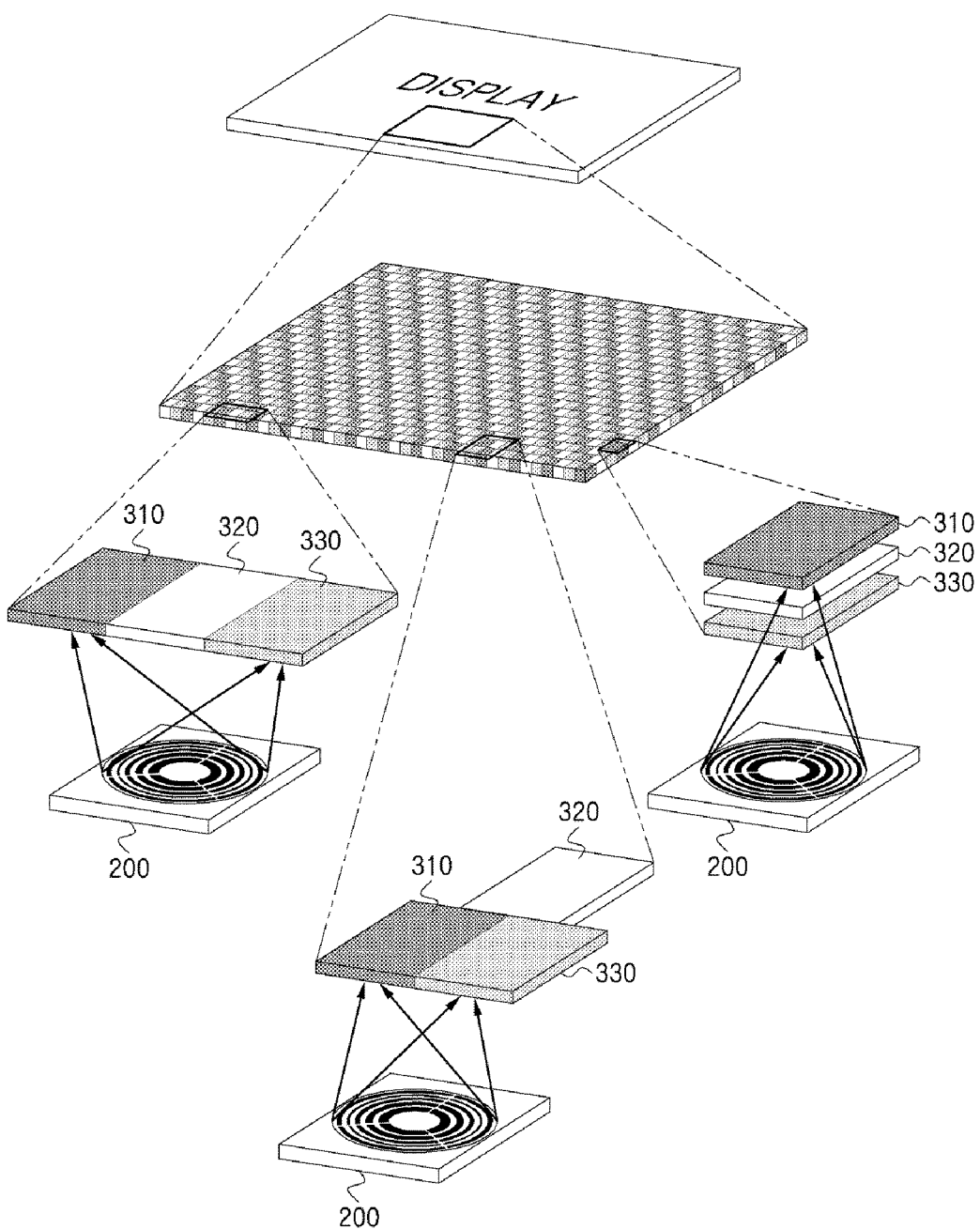
FIG. 6 is a view showing diverse embodiments in which three light conversion layers can be arranged in a display panel of the present invention.
Figure 7A:
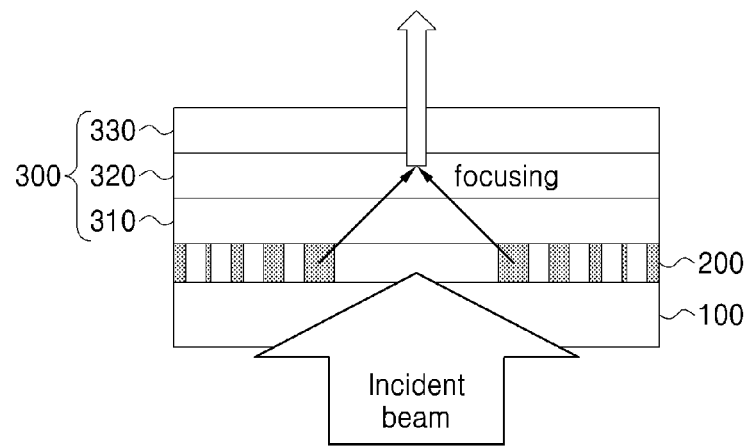
FIG. 7A is a view showing a process of converting incident light into first light by a first light conversion layer by adjusting a focal point position in a lens layer when three light conversion layers are arranged side by side in the horizontal direction.
Figure 7B:
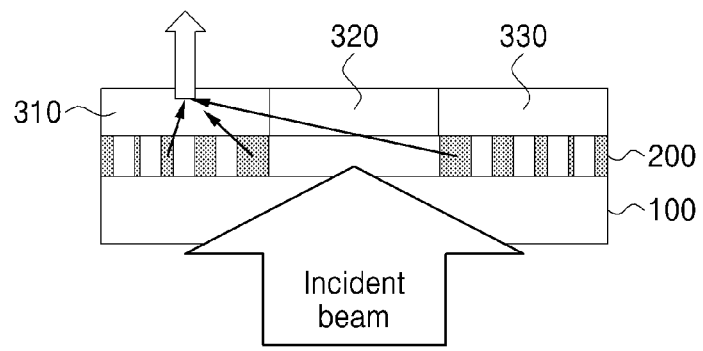
FIG. 7B is a view showing a process of converting incident light into second light by a second light conversion layer by adjusting a focal point length in a lens layer when the light conversion layers are stacked in order.

FIG. 4A is a side view showing a display panel in which three light conversion layers are stacked in order according to an embodiment of the present invention, and FIG. 4B is a cross-sectional view taken along the line A-A' of a display panel in which a lens layer is partitioned into three areas, FIG. 5 is a view showing a process of freely adjusting a focal point position in a three-dimensional space by adjusting magnitude of a voltage applied to a lens layer partitioned into three areas, FIG. 6 is a view showing diverse embodiments in which three light conversion layers can be arranged in a display panel of the present invention, FIG. 7A is a view showing a process of converting incident light into first light by a first light conversion layer by adjusting a focal point position in a lens layer when three light conversion layers are arranged side by side in the horizontal direction, and FIG. 7B is a view showing a process of converting incident light into second light by a second light conversion layer by adjusting a focal point length in a lens layer when the light conversion layers are stacked in order.

While an embodiment of partitioning the lens layer 200 into two areas has been described above, the lens layer 200 of the present invention may be partitioned into three areas of the first lens unit 210, the second lens unit 220 and the third lens unit 230 as shown in FIGS. 4B and 5.

In addition, the power supply unit 400 may move the focal point position on the same plane and also freely adjust the focal point position in a three-dimensional space, unlike when the lens layer 200 is partitioned into two areas, by adjusting the magnitudes of the voltages applied to the first lens unit 210, the second lens unit 220 and the third lens unit 230.

That is, when the lens layer 200 is partitioned into two areas, the number of variables that can adjust the refractive index of light entering the lens layer 200 is two, and the focal point position may be adjusted only in the left, right, up and down directions (adjust the focal point length) on the same plane. However, when the lens layer 200 is partitioned into three areas as shown in FIGS. 4B and 5, the number of variables that can adjust the refractive index of light entering the lens layer 200 is three, and the focal point position may be freely adjusted on the X, Y and Z axes.

Since the pixels, i.e., the light conversion layer 300, can be freely arranged as the focal point position can be freely adjusted, as shown in FIG. 6, i) the first light conversion layer 310, the second light conversion layer 320 and the third light conversion layer 330 may be arranged on the lens layer 200 side by side in the horizontal direction, ii) the first light conversion layer 310, the second light conversion layer 320 and the third light conversion layer 330 may be stacked on the lens layer 200 in order, or iii) the first light conversion layer 310 may be arranged at an upper position, and the second light conversion layer 320 and the third light conversion layer 330 may be arranged side by side under the first light conversion layer 310 on the same plane. At this point, only three embodiments related to the form of arranging the light conversion layers are shown in FIG. 6, it is not limited thereto, and as the focal point position can be freely adjusted in a three-dimensional space, the first light conversion layer 310, the second light conversion layer 320 and the third light conversion layer 330 may be arranged in another form without a problem.

Accordingly, the display panel according to an embodiment of the present invention may adjust the magnitudes of the voltages applied to the first lens unit 210, the second lens unit 220 and the third lens unit 230 even when the first light conversion layer 310, the second light conversion layer 320 and the third light conversion layer 330 are arranged on the lens layer 200 side by side in the horizontal direction as shown in FIG. 7A, to adjust the focal point position toward the first light conversion layer 310 so that the light entering the first light conversion layer 310 may be converted into the first light or to adjust the focal point position toward the third light conversion layer 330 so that the light entering the first light conversion layer 330 may be converted into the third light.

In addition, even when the first light conversion layer 310, the second light conversion layer 320 and the third light conversion layer 330 are stacked on the lens layer 200 in order as shown in FIG. 7B, the focal point position may be placed on the first light conversion layer 310, the second light conversion layer 320 or the third light conversion layer 330 by adjusting the focal point length. At this point, since the effect of arranging the light conversion layer 300 is the same as described above, detailed description on the effect is omitted.

Next, a display panel of a method of indirectly applying a voltage to the lens layer, which is still another embodiment of the present invention, will be described with reference to FIGS. 8A, 8B and 9.

Figure 8A:
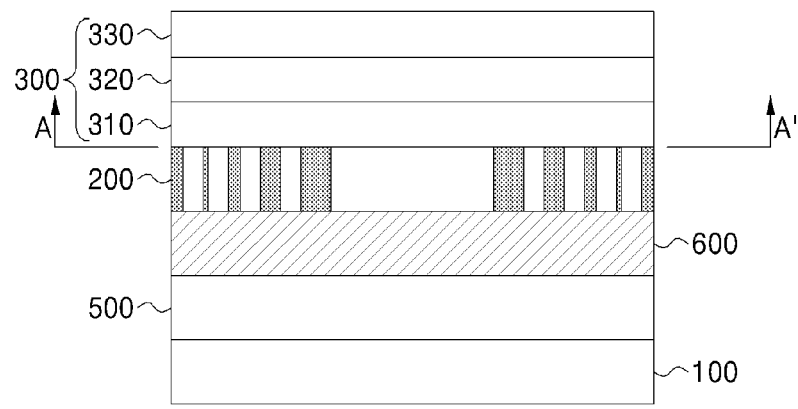
FIG. 8A is a side view showing a display panel in which three light conversion layers are stacked in order according to still another embodiment of the present invention.
Figure 8B:
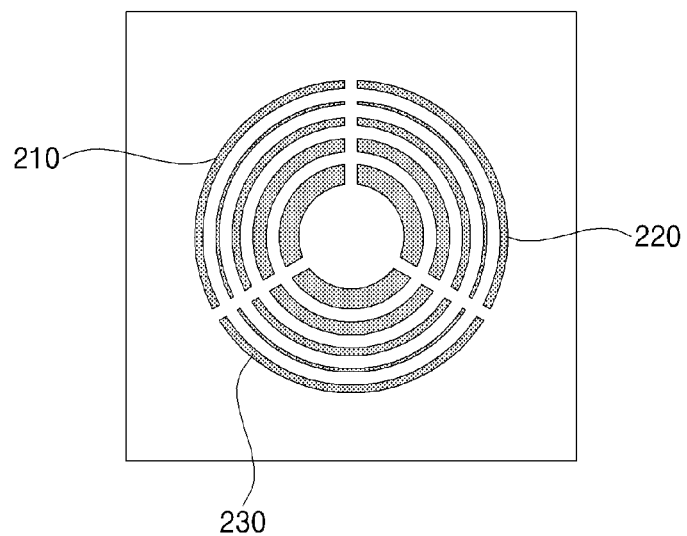
FIG. 8B is a side view showing a display panel in which three light conversion layers are arranged side by side in the horizontal direction.
Figure 9:
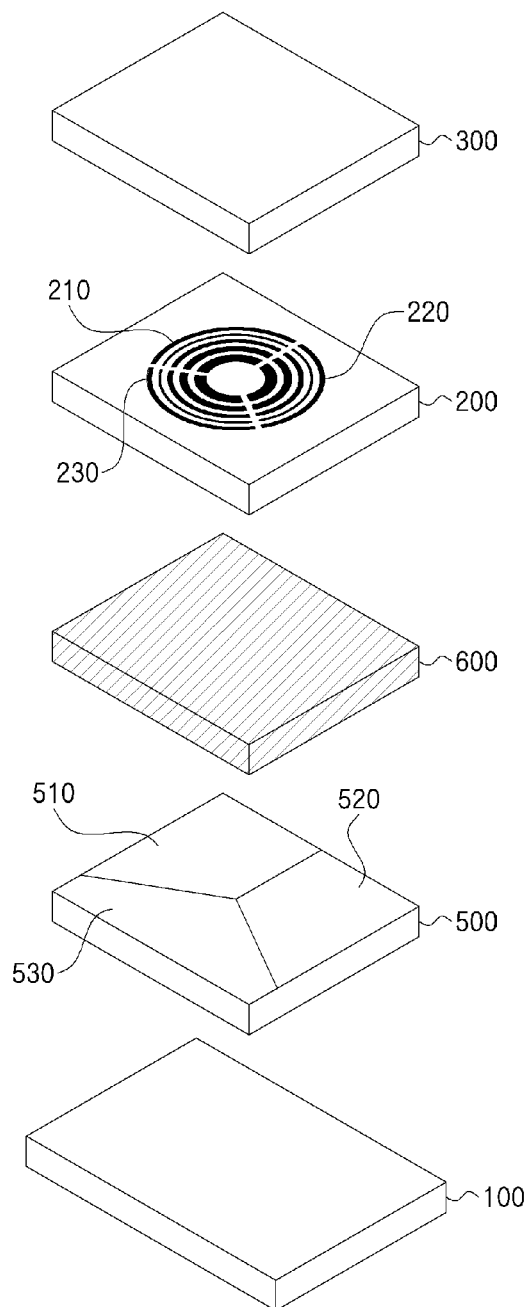
FIG. 9 is an exploded view showing a display panel according to still another embodiment of the present invention.

FIG. 8A is a side view showing a display panel in which three light conversion layers are stacked in order according to still another embodiment of the present invention, FIG. 8B is a side view showing a display panel in which three light conversion layers are arranged side by side in the horizontal direction, and FIG. 8B is a cross-sectional view taken along the line A-A' of a display panel in which a lens layer is partitioned into three areas. FIG. 9 is an exploded view showing a display panel according to still another embodiment of the present invention.

At this point, although it is shown in FIGS. 7A, 7B, 8A and 8B that an electrode layer 500 is stacked on the substrate 100, it is not limited thereto, and the electrode layer 500 may be positioned on a BLU or may be positioned on an LED, an OLED, or a micro LED.

A display panel according to still another embodiment of the present invention includes: an electrode layer 500; an insulation layer 600 stacked on the electrode layer 500 and having an insulation characteristic; a lens layer 200 stacked on the insulation layer 600 and having a two-dimensional Fresnel pattern formed thereon to adjust a path of light entering from a light source; and a light conversion layer 300 stacked on the lens layer 200 to convert a color of light that has passed through the lens layer 200, and particularly, as the lens layer is partitioned into a plurality of areas and the electrode layer 500 adjusts the voltage applied to each area of the lens layer 200 partitioned into a plurality of areas, the focal point position can be changed in a three-dimensional space.

While the focal point position is adjusted by directly applying a voltage to the lens layer 200 in the display panel according to an embodiment of the present invention, in the display panel according to still another embodiment of the present invention, the electrode layer 500 and the insulation layer 600 are provided, and if electrons in the electrode layer 500 are excited in a principle similar to that of a capacitor, a voltage is indirectly is applied to the lens layer 200 positioned to face the electrode layer 500 with the intervention of the insulation layer 600, and there is a difference between the embodiments in the method of applying a voltage to the lens layer 200.

At this point, although the electrode layer 500 may be a transparent electrode layer like indium tin oxide (ITO) or may be graphene the same as that of the lens layer 200, it is not limited thereto, and it may be configured of any other material as far as it may apply a voltage to the lens layer 200, like transparent conductive oxide (TCO), conductive polymers, metal grid, carbon nanotubes, nanowire meshes, or ultras thin metal films without a problem. In addition, the insulation layer 600 may be configured of a material basically having an insulation characteristic, may be formed using an inorganic or organic material, may be formed using epoxy-based insulation resin, or may be configured to include silicon oxide or silicon nitride, and may be configured of, for example, $SiO_2$, SiN, $SiO_xN_y$, $TiO_2$, $Si_3N_4$, $Al_2O_3$, TiN, AlN, $ZrO_2$, TiAlN, TiSiN or the like. However, it is not limited thereto, and other kinds of materials having an insulation characteristic may be used without a problem.

In addition, although the lens layer 200 of the display panel according to still another embodiment of the present invention may be partitioned into two areas of the first lens unit 210 and the second lens unit 220 as described above and adjust a focal point position to the left or right direction, the lens layer 200 may be preferably partitioned into three areas of the first lens unit 210, the second lens unit 220 and the third lens unit 230 to freely adjust the focal point position in a three-dimensional space.

In addition, the electrode layer 500 may be configured of a first electrode layer 510 for applying a voltage to the first lens unit 210, a second electrode layer 520 for applying a voltage to the second lens unit 220, and a third electrode layer 530 for applying a voltage to the third lens unit 230, to adjust magnitudes of the voltages applied to the first lens unit 210, the second lens unit 220 and the third lens unit 230, and when the lens layer 200 is partitioned into two areas, the electrode layer 500 may be partitioned into the first electrode layer 510 and the second electrode layer 520.

At this point, the first electrode layer 510, the second electrode layer 520 and the third electrode layer 530 may freely adjust the focal point position in a three-dimensional space by adjusting the magnitudes of the voltages applied to the first lens unit 210, the second lens unit 220 and the third lens unit 230, and since a further higher voltage should be applied to adjust the equal refractive index as the areas of the partitioned lens units are wider as described above, the electronic layers 510, 520 and 530 may adjust the magnitudes of the applied voltages according to the ratio of the areas of the lens units considering the areas of the first lens unit 210, the second lens unit 220 and the third lens unit 230.

At this point, the first lens unit 210, the second lens unit 220 and the third lens unit 230 are preferably partitioned into equal areas to effectively adjust the focal point position, and the first electrode layer 510, the second electrode layer 520 and the third electrode layer 530 are preferably partitioned into equal areas to match the lens units.

In addition, the light conversion layer 300 may include a first light conversion layer 310 for converting incident light into first light, a second light conversion layer 320 for converting incident light into second light, and a third light conversion layer 330 for converting incident light into third light, and the first light conversion layer 310, the second light conversion layer 320 and the third light conversion layer 330 may be i) arranged on the lens layer 200 side by side in the horizontal direction as shown in FIG. 8A or ii) stacked on the lens layer 200 in order as shown in FIG. 8B, or iii) the first light conversion layer 310 may be arranged at an upper position, and the second light conversion layer 320 and the third light conversion layer 330 may be arranged side by side under the first light conversion layer 310 on the same plane as described above in FIG. 6.

Finally, a method of manufacturing a display panel according to still another embodiment of the present invention will be described with reference to FIG. 10.

Figure 10:
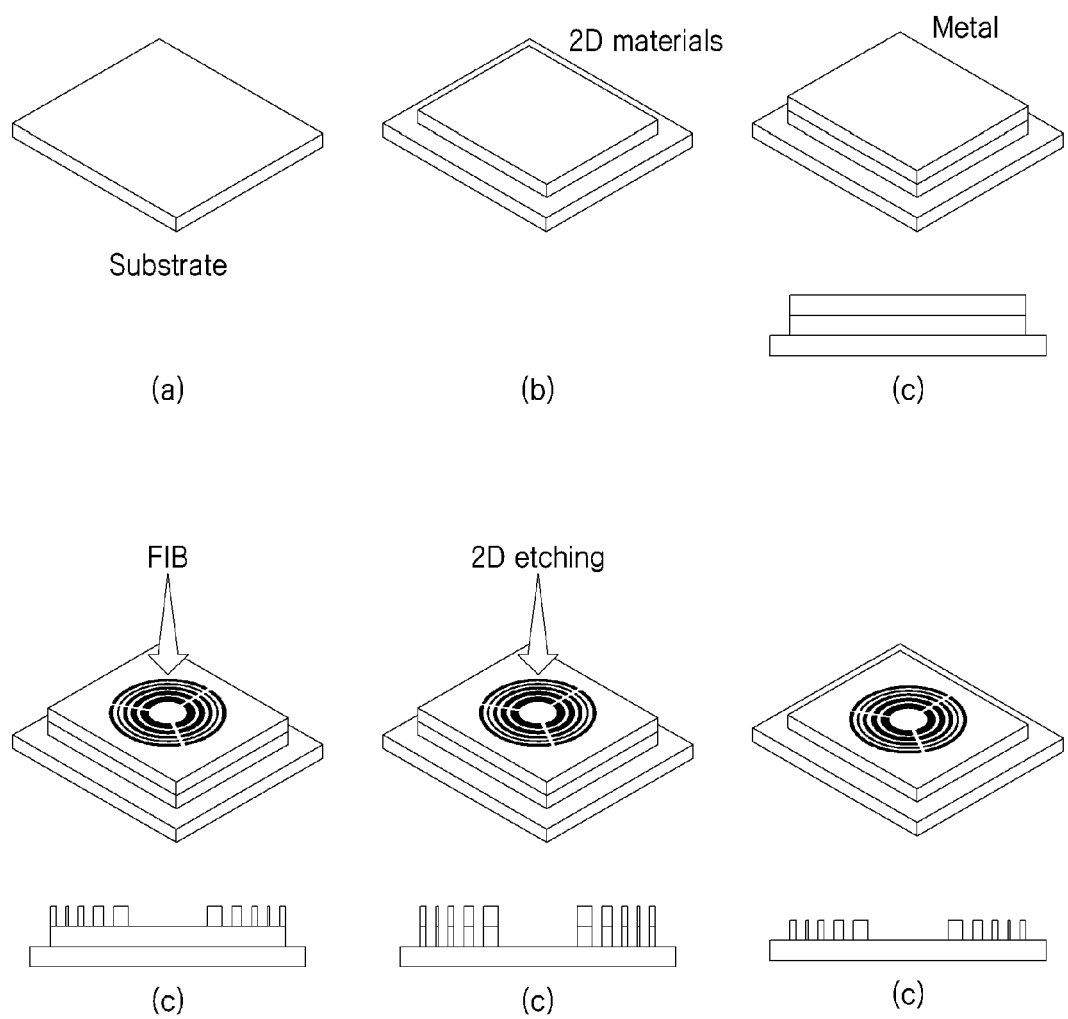
FIG. 10 is a view showing a process of manufacturing a display panel according to still another embodiment of the present invention.

FIG. 10 is a view showing a process of manufacturing a display panel according to still another embodiment of the present invention.

A method of manufacturing a display panel according to an embodiment of the present invention includes the steps of: (a) transferring graphene, which is a two-dimensional material, on a substrate; (b) depositing a metal film on the transferred graphene; (c) etching the metal film in a Fresnel pattern; (d) etching the graphene after etching the metal film; and (e) stacking a light conversion layer after removing the metal film.

Although the graphene is transferred on the substrate at step (a), it is not limited thereto, and although the graphene is transferred on a glass or a quartz instead of directly transferring the graphene on the substrate, and the lens layer is made by etching the Fresnel pattern, and the lens layer is stacked on the substrate, it does not make a problem.

In addition, the method may further include the step of i) connecting a power supply unit to the lens layer after stacking the light conversion layer on the graphene layer (i.e., lens layer) on which a Fresnel pattern is formed; or ii) stacking an electrode layer and an insulation layer on the substrate before etching the graphene.

In addition, although a photolithography method, an E-beam lithography method, a laser writing method or the like may be used in the process of forming a Fresnel pattern by etching the graphene, the method of manufacturing a display panel according to an embodiment of the present invention is characterized by etching the graphene using a focused ion beam apparatus.

Although the FIB method is suitable for forming a Fresnel pattern as it has an advantage of stacking a structure stacked in nanoscales, there is a constraint in that an etching target should have a conductive property.

Although the graphene has properties similar to those of a metal since its thermal and electrical characteristics are excellent, it is not a conductor and has a problem in that a Fresnel pattern is not formed precisely when the graphene is directly etched by FIB.

Accordingly, an object of the method of manufacturing a display panel according to an embodiment of the present invention is to solve the problems described above by depositing a metal film on the graphene transferred on the substrate. Specifically, since the method of manufacturing a display panel of the present invention is able to enhance preciseness of the FIB by strengthening the conductive property of the graphene while utilizing the metal film as a mask in the process of etching the graphene after depositing the metal film, the Fresnel pattern may be formed more precisely, and the lens layer may be partitioned in a plurality of areas by precisely distinguishing the boundaries between Fresnel patterns.

As a focal point position, as well as a focal point length, can be adjusted, the ratio of R, G and B can be adjusted without a transistor and a wire separately, and thus the aperture ratio of the display panel can be enhanced.

In addition, as the display panel of the present invention may adjust even a focal point position, the light conversion layers for converting incident light into light of R, G and B may be arranged in the horizontal direction and, in addition, the R, G and B light conversion layers may be stacked in order, and thus the resolution of the display panel can be enhanced by minimizing the pixel size.

In addition, since the heat generated by the transistor is not directly transferred to the light conversion layer in the display panel of the present invention, damage of the display panel by the transistor can be minimized.

Although preferred embodiments and application examples of the present invention have been shown and described above, the present invention is not restricted by the specific embodiments and application examples described above, and it is to be appreciated that those skilled in the art may make diverse modified embodiments without departing from the gist of the present invention claimed in the claims, and these modified embodiments should not be individually understood from the spirit or prospect of the present invention.

In addition, the terms used in the present invention are used to describe only specific embodiments and are not intended to limit the present invention. Singular forms are intended to include plural forms unless the context clearly indicates otherwise.

The scope of the present invention should be interpreted by the claims described below, and all the spirits within the scope equal to the claims should be interpreted as being included in the scope of the present invention.

What is claimed is:

1. A display panel comprising:
    a lens layer having a two-dimensional Fresnel pattern formed thereon to adjust a path of light entering from a light source;
    a light conversion layer stacked on the lens layer to convert a color of light that has passed through the lens layer; and
    a power supply for directly applying a voltage to the lens layer,
    wherein the lens layer is partitioned into a plurality of areas, the power supply adjusts the voltage applied to each of the plurality of areas of the lens layer, and a focal point position of the light is changed in a three-dimensional space by varying a refractive index in each of the plurality of areas of the lens layer according to the voltage applied to each of the plurality of areas.

2. The display panel according to claim 1, wherein the lens layer is a two-dimensional flat lens.

3. The display panel according to claim 1, wherein the light conversion layer includes:
    a first light conversion layer for converting incident light into first light;
    a second light conversion layer for converting the incident light into second light; and
    a third light conversion layer for converting the incident light into third light.

4. The display panel according to claim 3, wherein the lens layer is partitioned into two areas of a first lens unit and a second lens unit, and the first light conversion layer, the second light conversion layer, and the third light conversion layer are arranged on the lens layer side by side in a horizontal direction.

5. The display panel according to claim 4, wherein the power supply may freely adjust the focal point position on a same plane by applying different voltages to the first lens unit and the second lens unit.

6. The display panel according to claim 3, wherein the lens layer is partitioned into three areas of a first lens unit, a second lens unit, and a third lens unit.

7. The display panel according to claim 6, wherein the power supply may freely adjust the focal point position in a three-dimensional space by adjusting magnitudes of the voltages applied to the first lens unit, the second lens unit and the third lens unit.

8. The display panel according to claim 6, wherein the first light conversion layer, the second light conversion layer, and the third light conversion layer are arranged on the lens layer side by side in a horizontal direction.

9. The display panel according to claim 6, wherein the first light conversion layer, the second light conversion layer, and the third light conversion layer are stacked on the lens layer in order.

10. The display panel according to claim 1, wherein when the focal point position is adjusted, the power supply adjusts magnitude of a voltage applied to each of the partitioned areas of the lens layer according to an area ratio of the partitioned lens layers.

11. A display panel comprising:
an electrode layer;
an insulation layer stacked on the electrode layer;
a lens layer stacked on the insulation layer and having a two-dimensional Fresnel pattern formed thereon to adjust a path of light entering from a light source; and
a light conversion layer stacked on the lens layer to convert a color of light that has passed through the lens layer,
wherein the lens layer is partitioned into a plurality of areas, the electrode layer adjusts a voltage applied to each of the plurality of areas of the lens layer, and a focal point position of the light is changed in a three-dimensional space by varying a refractive index in each of the plurality of areas of the lens layer according to the voltage applied to each of the plurality of areas.

12. The display panel according to claim 11, wherein the electrode layer adjusts the magnitude of the voltage applied to each of the partitioned areas of the lens layer according to an area ratio of the partitioned lens layers.

13. The display panel according to claim 12, wherein the lens layer is partitioned into three areas of a first lens unit, a second lens unit, and a third lens unit, and the electrode layer includes:
a first electrode layer for applying a voltage to the first lens unit;
a second electrode layer for applying a voltage to the second lens unit; and
a third electrode layer for applying a voltage to the third lens unit.

14. The display panel according to claim 13, wherein the first electrode layer, the second electrode layer and the third electrode layer may freely adjust the focal point position in a three-dimensional space by adjusting the magnitudes of the voltages applied to the first lens unit, the second lens unit and the third lens unit.

15. The display panel according to claim 13, wherein the light conversion layer includes:
a first light conversion layer for converting incident light into first light;
a second light conversion layer for converting the incident light into second light; and
a third light conversion layer for converting the incident light into third light,
wherein the first light conversion layer, the second light conversion layer, and the third light conversion layer are arranged on the lens layer side by side in a horizontal direction.

16. The display panel according to claim 13, wherein the light conversion layer includes:
a first light conversion layer for converting incident light into first light;
a second light conversion layer for converting the incident light into second light; and
a third light conversion layer for converting the incident light into third light,
wherein the first light conversion layer, the second light conversion layer, and the third light conversion layer are stacked on the lens layer in order.

* * * * *